(12) United States Patent
Jin et al.

(10) Patent No.: US 12,101,237 B2
(45) Date of Patent: Sep. 24, 2024

(54) METHODS AND NODES FOR MATCHING PARAMETERS WITH CORRESPONDING KEY PERFORMANCE INDICATORS IN A COMMUNICATIONS NETWORK

(71) Applicant: Telefonaktiebolaget LM Ericsson (publ), Stockholm (SE)

(72) Inventors: Yifei Jin, Solna (SE); Marios Daoutis, Bromma (SE); Lackis Eleftheriadis, Valbo (SE); Aneta Vulgarakis Feljan, Stockholm (SE); Saurabh Singh, Vallentuna (SE); Alexandros Nikou, Danderyd (SE); Ioannis Fikouras, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/254,515

(22) PCT Filed: Nov. 27, 2020

(86) PCT No.: PCT/EP2020/083758
§ 371 (c)(1),
(2) Date: May 25, 2023

(87) PCT Pub. No.: WO2022/111816
PCT Pub. Date: Jun. 2, 2022

(65) Prior Publication Data
US 2024/0007363 A1     Jan. 4, 2024

(51) Int. Cl.
*H04L 41/5009* (2022.01)
*H04L 41/0806* (2022.01)
(Continued)

(52) U.S. Cl.
CPC ...... *H04L 41/5009* (2013.01); *H04L 41/0806* (2013.01); *H04L 41/142* (2013.01); *H04L 41/16* (2013.01)

(58) Field of Classification Search
CPC ............. H04L 41/5009; H04L 41/0806; H04L 41/142; H04L 41/16
See application file for complete search history.

(56) References Cited

U.S. PATENT DOCUMENTS

2018/0019910 A1 * 1/2018 Tsagkaris .............. H04W 24/02
2019/0354689 A1   11/2019 Li et al.
(Continued)

OTHER PUBLICATIONS

Xingbo et al.; "Joint Link Prediction and Network Alignment via Cross-Graph Embedding"; Macao, Aug. 10-16, 2019; School of Computer Science and Software Engineering, East China Normal University; Proceedings of the Twenty-Eighth International Joint Conference on Artificial Intelligence (Year: 2019).*

(Continued)

*Primary Examiner* — Glenton B Burgess
*Assistant Examiner* — Jihad K Boustany
(74) *Attorney, Agent, or Firm* — Michael D. Murphy

(57) ABSTRACT

A computer implemented method performed by a node in a communications network for matching parameters in a target network configuration with corresponding key performance indicators, KPIs, in the communications network. The method comprises obtaining (202) a first set of connections between a first subset of the parameters and a first subset of the KPIs. The method further comprises representing (204) the parameters as a first knowledge graph, representing (206) the KPIs as a second knowledge graph, and using (208) a graph-based machine learning process on the first knowledge graph and the second knowledge graph to match a second parameter to a second KPI.

13 Claims, 8 Drawing Sheets

(51) Int. Cl.
    *H04L 41/142* (2022.01)
    *H04L 41/16* (2022.01)

(56) References Cited

U.S. PATENT DOCUMENTS

| | | | | |
|---|---|---|---|---|
| 2020/0186411 | A1* | 6/2020 | Ravichandran | H04L 41/0659 |
| 2021/0160147 | A1* | 5/2021 | Chou | H04L 43/0817 |
| 2021/0349747 | A1* | 11/2021 | Albasheir | G06F 11/302 |
| 2022/0417339 | A1* | 12/2022 | Rossi | H04L 43/067 |

OTHER PUBLICATIONS

Barkan, Oren, et al., "ITEM2VEC: Neural Item Embedding for Collaborative Filtering", 2016 IEEE International Workshop on Machine Learning for Signal Processing, Salerno, Italy, Sep. 13-16, 2016, 6 pages.

Devlic, Alisa, et al., "NESMO: Network Slicing Management and Orchestration Framework", ICC2017: WT01-5GArch 2017: 4th International Workshop on 5G Architecture, 2017 IEEE, 2017, 7 pages.

Du, Xingbo, et al., "Joint Link Prediction and Network Alignment via Cross-graph Embedding", Proceedings of the Twenty-Eighth International Joint Conference on Artificial Intelligence (IJCAI-19), Aug. 1, 2019, 7 pages.

Sgambelluri, A, et al., "Orchestration of Network Services Across Multiple Operators: The 5G Exchange Prototype", 2017 European Conference on Networks and Communications (EuCNC), Oulu, 2017, 5 pages.

Taleb, Tarik, et al., "On Multi-Domain Network Slicing Orchestration Architecture and Federated Resource Control", IEEE Network, Digital Object Identifier: 10.1109/MNET.2018.1800267, 2019, 11 pages.

Wang, Zhichun, et al., "Cross-lingual Knowledge Graph Alignment via Graph Convolutional Networks", Proceedings of the 2018 Conference on Empirical Methods in Natural Language Processing, Brussels, Belgium, Oct. 31-Nov. 4, 2018, 9 pages.

Xu, Kun, et al., "Cross-lingual Knowledge Graph Alignment via Graph Matching Neural Network", arxiv.org, Cornell University Library, 201 Olin Library Cornell University, NY 14853, XP081451423, May 28, 2019, 6 pages.

* cited by examiner

METHODS AND NODES FOR MATCHING PARAMETERS WITH CORRESPONDING KEY PERFORMANCE INDICATORS IN A COMMUNICATIONS NETWORK

TECHNICAL FIELD

This disclosure relates to methods, nodes and systems in a communications network. More particularly but non-exclusively, the disclosure relates to matching parameters in a target network configuration with corresponding key performance indicators, KPIs, in the communications network.

BACKGROUND

In order to support different types of communication services at the same time over the same network, 5G introduces the concept of a "network slice": a logical network that is provisioned with a set of isolated virtual resources on shared physical infrastructure. Users, ranging from private individuals to small and medium enterprises to global multinationals, may request and access one or more network slice instances (NSIs). Between request and access, the Network Operator (NOP) designs an appropriate network slice template (NST), and creates the NSI based on the template.

During NSI deployment and operation, it is desirable to optimize the NST towards the customer's service requirements. These requirements are expressed in the form of a target network configuration (e.g. such as a business intent (BI)). A target network configuration is an information system and mechanism, usually defined and agreed by the customer, aimed at optimizing, constraining or ensuring a certain network behavior or characteristic.

The parameters (or entities) pertaining to the target network configuration often represent sets of business goals, Service Level Agreement (SLA) information, financial targets associated with use of the communications network and behavioral guidelines, and/or combinations of the above. These are often human-readable quantities, for example. Implementation of target network configurations in a communications network is achieved by defining policy rules and KPI targets that reflect the goals in the target network configuration. A target network configuration may be implemented, for example, by specifying Quality of Service (QoS) KPIs (latency, throughput), or site reliability KPIs (redundancy presence, security factors).

Associating (e.g. converting) a target network configuration into related KPI targets that can be measured in the communications network, can take large amounts of expert human effort, and can be error-prone.

It is an object of embodiments herein to improve on this situation.

SUMMARY

As discussed above, there exists a need to provide multiple network slices per communication service, with different combinations of target network configurations (BIs) according to widely variant demands. This is known as multi-domain slice orchestration. Multi-domain orchestration looks into deploying NSIs across different vendors, where every vendor "owns" part of the resources needed for end-to-end deployment of the NSI (e.g. transport, compute-storage, radio). This is described in the following papers: A. Devlic, A. Hamidian, D. Liang, M. Eriksson, A. Consoli and J. Lundstedt, entitled "*NESMO: Network slicing management and orchestration framework,*" 2017 IEEE International Conference on Communications Workshops (ICC Workshops), Paris, 2017, pp. 1202-1208; A. Sgambelluri et al., entitled "*Orchestration of Network Services across multiple operators: The 5G Exchange prototype,*" 2017 European Conference on Networks and Communications (EuCNC), Oulu, 2017, pp. 1-5; and Tank Taleb, Ibrahim Afolabi, Konstantinos Samdanis, and Faqir Zarrar Yousaf, entitled, "*On Multi-domain Network Slicing Orchestration Architecture & Federated Resource Control*".

Identifying how to provision NSIs to best meet target network configurations using policies and rule logics, according to the constraints and available resources from these vendors, can be a laborious and time-consuming task requiring efforts from different domain experts. Turning factors are various and can span across the selection of configuration on-site, network infrastructure setup, etc.

As the target network configurations can be seen as high-level descriptions, to become meaningful, they often need to be associated or mapped to appropriate sets of KPIs (e.g., specific to local vendors). Since target network configurations (goals) and KPIs (observations plus agent capabilities) are representations in different domains, one problem lies in proposing the most appropriated and related actions that satisfy the given target network configuration proposals.

In many current implementations, the matching between parameters in high-level target network configurations and actions towards technical KPIs is hard-coded, which requires expert knowledge in building decision-tree like logic in the Operational Support System (OSS). This process is time consuming and requires technical skills from domain experts to facilitate all the necessary actions which should be carried out towards associating mappings of target network configurations to the corresponding related KPIs.

Moreover, there may exist latent relations between target network configurations and KPIs, which a human expert might not be aware and therefore fail to capture. For example, it may be apparent to a human-operator that to meet a latency requirement, action may be taken to move a data center to a geographic location that is closer to the site in question. However, it can be hard for technician to capture that a closer data center location might have more congestions on the serving local core, thus having a closer location may not actually help to meet the target network configuration in the manner initially expected.

It is as object of embodiments herein to improve on this situation.

Thus according to a first aspect there is a method performed by a node in a communications network for matching parameters in a target network configuration with corresponding key performance indicators, KPIs, in the communications network. The method comprises obtaining a first set of connections between a first subset of the parameters and a first subset of the KPIs; representing the parameters as a first knowledge graph; representing the KPIs as a second knowledge graph; and using a graph-based machine learning process on the first knowledge graph and the second knowledge graph to match a second parameter to a second KPI.

According to a second aspect there is a node in a communications network for matching parameters in a target network configuration with corresponding key performance indicators, KPIs, in the communications network. The node comprises a memory comprising instruction data representing a set of instructions, and a processor configured to communicate with the memory and to execute the set of instructions. The set of instructions, when executed by the processor, cause the processor to: obtain a first set of connections between a first subset of the parameters and a first subset of the KPIs; represent the parameters as a first knowledge graph; represent the KPIs as a second knowledge graph; and use a graph-based machine learning process on the first knowledge graph and the second knowledge graph to match a second parameter to a second KPI.

According to a third aspect, there is a node in a communications network for matching parameters in a target network configuration with corresponding key performance indicators, KPIs, in the communications network. The node comprises processing circuitry adapted to: obtain a first set of connections between a first subset of the parameters and a first subset of the KPIs, represent the parameters as a first knowledge graph, represent the KPIs as a second knowledge graph, and use a graph-based machine learning process on the first knowledge graph and the second knowledge graph to match a second parameter to a second KP.

According to a fourth aspect there is a computer program comprising instructions which, when executed on at least one processor, cause the at least one processor to carry out the method of the first aspect.

According to a fifth aspect there is a carrier containing a computer program according to the third aspect. In such embodiments, the carrier comprises one of an electronic signal, optical signal, radio signal or computer readable storage medium.

According to a sixth aspect there is a computer program product comprising non transitory computer readable media having stored thereon a computer program according to the third aspect.

There is thus provided methods and nodes for matching and converting parameters in a target network configuration with corresponding key performance indicators, KPIs, in the communications network. The use of graph-based methods means that target network configurations may be matched to KPIs in an automated manner, without the need for (potentially extensive) human expert input. Within one domain, graph-based methods capture the complex interdependencies between the parameters in the target network configuration and the KPIs. From a cross-domain perspective, graph-based methods provide similarity measurements, beyond the targeting entity pairs, but also referencing the neighbouring entities' (e.g. parameters-KPIs) similarities. Errors due to human-failure may be reduced. Furthermore, connections between parameters in a target network configuration and KPIs that are hard or impossible for a human to determine may be reliably determined.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

As described above, target network configurations that are used (amongst other things) to specify NSI requirements during NSI deployment are expressed in terms of human-readable quantities and goals and it is a non-trivial task to convert these into KPI targets in the communications network that can be actioned and measured.

Embodiments herein propose the use of graph-based machine learning methods to determine associations between parameters in a target network configuration and measurable KPI targets. Embodiments herein may generally be performed by an OSS, for example, during the deployment and operation of NSI. As will be described in more detail below, a target network configuration represented as a knowledge graph may be matched to targeting KPI entities, in a KPI knowledge graph, based on a subset of existing (e.g. known) matching or corresponding entities between the two graphs.

There is thus provided methods and nodes for matching and converting parameters in a target network configuration with corresponding key performance indicators, KPIs, in the communications network. The use of graph-based methods means that target network configurations may be matched to KPIs in an automated manner, without the need for (potentially extensive) human expert input. Errors due to human-failure may be reduced. Furthermore, connections between parameters in a target network configuration and KPIs that are hard or impossible for a human to determine may be reliably determined.

In more detail, generally, the disclosure herein relates to a communications network (or telecommunications network). A communications network may comprise any one, or any combination of: a wired link (e.g. ASDL) or a wireless link such as Global System for Mobile Communications (GSM), Wideband Code Division Multiple Access (WCDMA), Long Term Evolution (LTE), New Radio (NR), WiFi, Bluetooth or future wireless technologies. The skilled person will appreciate that these are merely examples and that the communications network may comprise other types of links. A wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Figure 1:
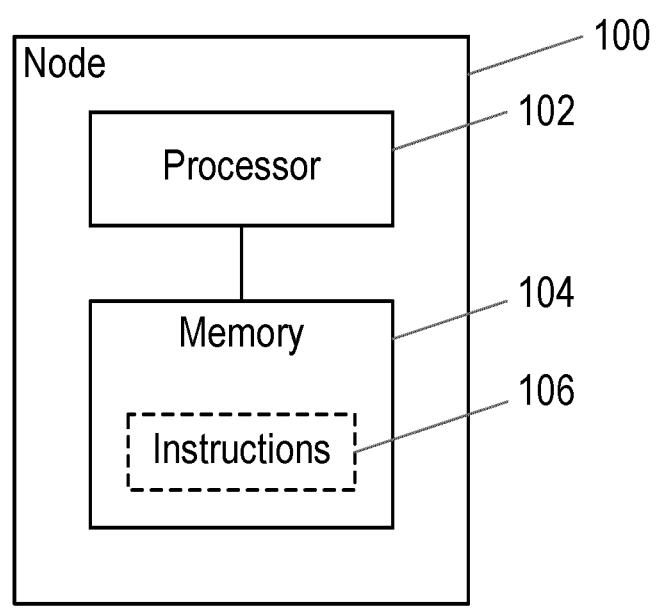
FIG. 1 shows a node according to some embodiments herein.

FIG. 1 illustrates a network node 100 in a communications network according to some embodiments herein. Generally, the node 100 may comprise any component or network function (e.g. any hardware or software module) in the communications network suitable for performing the functions described herein. For example, a node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

The node 100 is configured (e.g. adapted, operative, or programmed) to perform any of the embodiments of the method 200 as described below. It will be appreciated that the node 100 may comprise one or more virtual machines running different software and/or processes. The node 100 may therefore comprise one or more servers, switches and/or storage devices and/or may comprise cloud computing infrastructure or infrastructure configured to perform in a distributed manner, that runs the software and/or processes.

The node 100 may comprise a processor (e.g. processing circuitry or logic) 102. The processor 102 may control the operation of the node 100 in the manner described herein. The processor 102 can comprise one or more processors, processing units, multi-core processors or modules that are configured or programmed to control the node 100 in the manner described herein. In particular implementations, the processor 102 can comprise a plurality of software and/or hardware modules that are each configured to perform, or are for performing, individual or multiple steps of the functionality of the node 100 as described herein.

The node 100 may comprise a memory 104. In some embodiments, the memory 104 of the node 100 can be configured to store program code or instructions 106 that can be executed by the processor 102 of the node 100 to perform the functionality described herein. Alternatively or in addition, the memory 104 of the node 100, can be configured to store any requests, resources, information, data, signals, or similar that are described herein. The processor 102 of the node 100 may be configured to control the memory 104 of the node 100 to store any requests, resources, information, data, signals, or similar that are described herein.

It will be appreciated that the node 100 may comprise other components in addition or alternatively to those indicated in FIG. 1. For example, in some embodiments, the node 100 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 102 of node 100 may be configured to control such a communications interface to transmit to and/or receive from other nodes or network functions requests, resources, information, data, signals, or similar.

Briefly, in one embodiment, the node 100 may be configured obtain a first set of connections between a first subset of the parameters and a first subset of the KPIs; represent the parameters as a first knowledge graph; represent the KPIs as a second knowledge graph; and use a graph-based machine learning process on the first knowledge graph and the second knowledge graph to match a second parameter to a second KPI.

Figure 2:
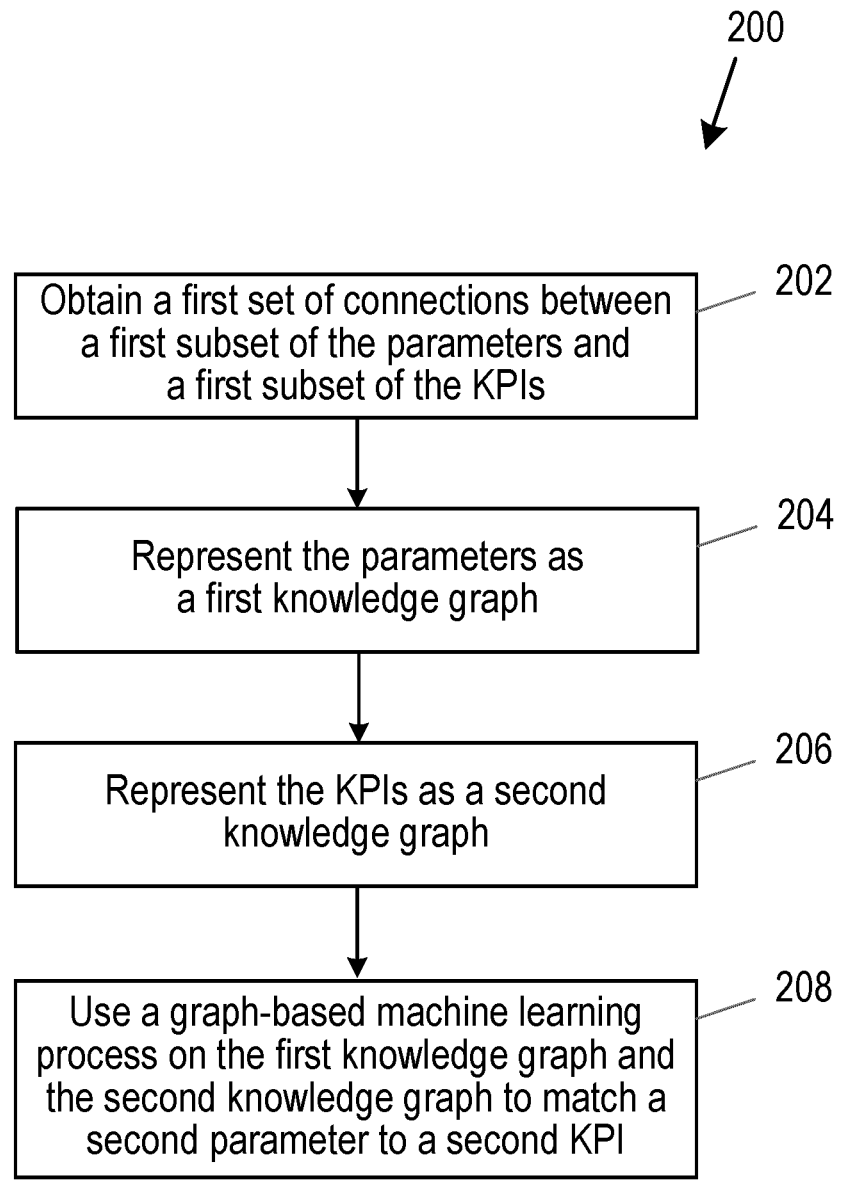
FIG. 2 shows a method according to some embodiments herein.

Turning now to FIG. 2 which shows a computer implemented method 200 according to some embodiments herein. The method 200 may be performed by a node in a communications network for matching parameters in a target network configuration with corresponding key performance indicators, KPIs, in the communications network. Briefly, in a first step 202 the method comprises obtaining a first set of connections between a first subset of the parameters and a first subset of the KPIs. In a second step 204, the method comprises representing the parameters as a first knowledge graph. In a third step 206 the method comprises representing the KPIs as a second knowledge graph, and in a fourth step 208 the method comprises using a graph-based machine learning process on the first knowledge graph and the second knowledge graph to match a second parameter to a second KPI.

In more detail, the target network configuration may comprise a set of network configuration parameters (referred to herein as "parameters"). The target network configuration may comprise one or more customer service requirements, and/or one or more business intents, BIs. The target network configuration may comprise business goals, SLA information, financial targets, behavioural guidelines, or combinations of the above. A target network configuration is generally an information system and mechanism, usually defined and agreed by a user (e.g. customer), aimed at optimizing, constraining or ensuring a certain network behavior or characteristic. As such, the target network configuration may be descriptive or human-readable.

In some embodiments, the target network configuration comprises a business intent, BI, for a network slice instance, NSI. In such embodiments, the method 200 may be used to match parameters in the BI for the NSI to corresponding KPIs for the NSI.

A target network configuration may comprise, for example, at least one of the following parameters: a cost level/rank, security of a data centre and network latency. These are merely examples however and a target network configuration may specify other parameters.

The key performance Indicators, KPIs, generally comprise measurable quantities in the communications network. In other words, observations of the current network state and characteristics. The target network configuration may be implemented by setting targets for KPIs, such as, for example, Service QoS KPIs (latency, throughput), or site reliability KPIs (redundancy presence, security factors).

The method 200 may thus be performed in order to match parameters in a target network configuration with equivalent KPIs so that the target network configuration can be converted into KPI targets that can be actioned and/or measured in the communications network.

In step 202 the method comprises obtaining a first set of connections between a first subset of the parameters in the target network configuration and a first subset of the KPIs. In this sense, a connection between a parameter in the target network connection and a KPI may indicate that the respective parameter may be expressed (or partially expressed) by the KPI.

The first set of connections describe relationships between target network configuration parameters and corresponding KPIs, that are known. For example, they may be clearly related quantities, or easily deduced by experience/experimentation.

Examples of parameters that may be comprised in the first subset of parameters include but are not limited to the following examples:

Target network configuration parameter: Cost level/rank (without commercial details)↔Corresponding KPI: optional price scheme, including, for example: Cost of floor space, cost of power, cost of connectivity (local tails (link connecting hub to the datacenter), internet connectivity, GRX and IPX)

Target network configuration parameter: Security of the data centre↔Corresponding KPI: camera existence/broke, lock existence in the cage/cabinet Target network configuration parameter: Network latency↔Corresponding KPI: Location of the data centre Target network configuration parameter: ANSI/APCO Public Safety Grade Site Hardening Requirement/ISO 27001↔Corresponding KPI: Local security condition, redundancy preparedness (Note that Public Safety Grade Site Hardening Requirements are often document as Approved American National standard (ANSI), with the information of the site preparedness for different component of the radio site, like antenna, fronthaul, backhaul, etc, in extreme cases, including flooding, storm, or other geographical specific event and the backup setup against these cases).

The first set of connections between the first subset of the parameters and the first subset of the KPIs may be obtained in various ways. For example, through expert knowledge whereby an engineer or other domain expert may provide example pairs of parameters and matching (or corresponding) KPIs.

In other embodiments, step 202 may comprise determining the first set of connections using natural language processing, NLP. For example, after training performed on an adequate corpus (e.g: Customer Product Information Repository (CPI Store) of technical documents and technical databases) one could align words with similar appearance pattern. E.g: The target network configuration parameter: "Coverage optimization" may be matched with the KPI: "site location in long./lat" based on linguistic similarity in meaning as deduced from such technical documents and technical databases.

The skilled person will be familiar with NLP processes suitable for matching parameters in the target network configuration with KPIs. As an example, step 202 could be performed using a Continuous Bag Of Words (CBOW) model. This is merely an example however, and other NLP processes may also be used.

In other embodiments, step 202 may comprise determining the first set of connections using a second machine learning model trained to predict connections between parameters and KPIs in the communications network. For example, a training dataset may used to train a machine learning model to predict corresponding KPIs for network configuration parameters. Such a training dataset may comprise, for example, expert defined pairs of parameters and corresponding KPIs and/or pairs of parameters and corresponding KPIs as determined through NLP as described above. The skilled person will be familiar with methods of training a machine learning model to predict an output for a given input parameter. For example, a neural network, or random forest algorithm may be trained using back-propagation or gradient descent.

In other embodiments, step 202 may comprise determining the first set of connections using a network analytics function or a Network Operation Centre (NOC). For example, a NOC may determine connections based on historical records (e.g. "trouble tickets").

Once obtained, the first set of parameters and corresponding/matching first set of KPIs can be used (effectively) as a training dataset in a graph-based machine learning process to determine other connections between the parameters and KPIs.

To this end, in step 204 the parameters are represented as a first knowledge graph (KG). This may include both the parameters in the first set of parameters and other parameters found in target network configurations (BIs). In other words parameters in a target network configuration space are represented in graph-form. Inputs to the first KG may be, for example, the relationships between parameters and their related (meta-)parameters. For example, the relationship between "service quality" (as one node in the KG) and "latency" (as another node in the KG).

In step 206, the KPIs are represented as a second knowledge graph. This may include both the KPIs in the first set of KPIs and other KPIs typically measured in a communications system. The skilled person will be familiar with ways in which to monitor and obtain information about KPIs in an OSS (e.g. using a (specialist) AI agent). The second KG may be determined based on (sets of) real KPI values. These may comprise time-series, Boolean values or other forms. Inputs to the second KG may be, for example, the relationships between parameters and their related (meta-)parameters. For example, the relationship between the KPI category "Coverage" (as one node in the KG) and KPI name "Cell_ID" (as another node in the KG). The skilled person will be familiar with graphs or "knowledge graphs". knowledge graphs comprise nodes and edges. Each node represents a parameter or KPI and each edge represents a relationship between the adjoining nodes. A data set may be represented as a knowledge graph, for example, using the techniques in the paper by Wang, Zhichun, et al. entitled "Cross-lingual knowledge graph alignment via graph convolutional networks." Proceedings of the 2018 Conference on Empirical Methods in Natural Language Processing. 2018; or the paper by Du, Xingbo, Junchi Yan, and Hongyuan Zha entitled: "Joint link prediction and network alignment via cross-graph embedding." Proceedings of the 28th International Joint Conference on Artificial Intelligence. AAAI Press, 2019.

Figure 3:
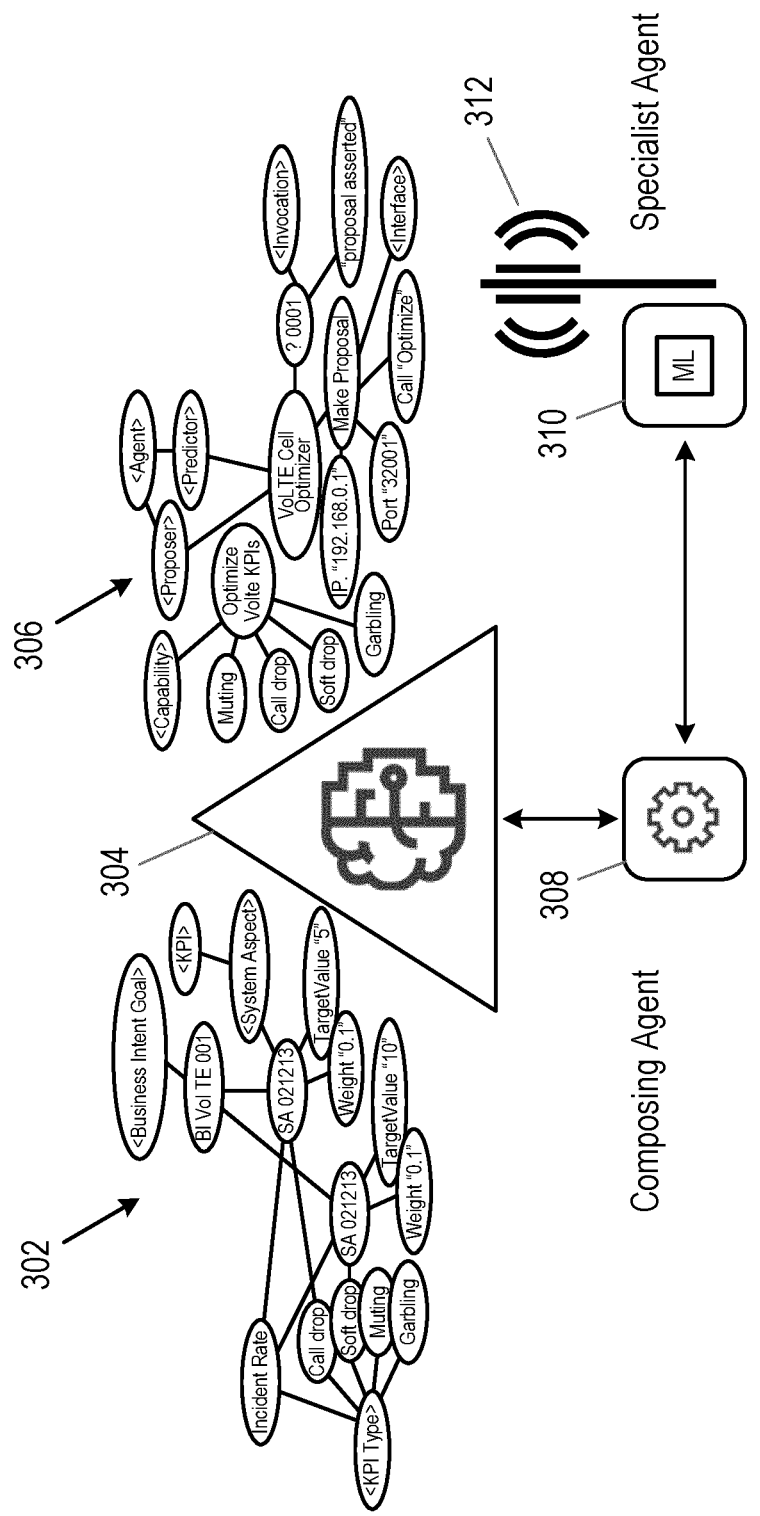
FIG. 3 illustrates a process according to some embodiments herein.

Steps 204 and 206 are illustrated in FIG. 3 which shows a first knowledge graph 302 corresponding to the parameters in a target network configuration, and a second knowledge graph corresponding to the KPIs of the communications system 304. In each knowledge graph, the nodes are represented by ovals, and the relationships by the lines between the nodes.

Once the first and second knowledge graphs are obtained, the method moves to step 208 whereby a graph-based machine learning process is used on the first knowledge graph and the second knowledge graph to match a second (and subsequent) parameter(s) to a second (and subsequent) KPI(s). Suitable the graph-based machine learning models include, for example, graph convolution networks, GCNs.

In other words, by learning from existing matching between the first set of parameters and the first set of KPIs, an intelligent agent may be introduced to recommend other matches.

Such an intelligent agent is illustrated by AI agent 304 in FIG. 3. In FIG. 3, AI agent 304 may match parameters in the target network configuration KG 302 to KPIs in the KPI KG 306. Composing Module 308 may then select an agent that can propose an action to improve the KPI, in order to move the communications network towards the configuration in the target network configuration. The Composing Module 308 may interact with a specialist agent 310 that provides proposals that can then be actioned by the communications network 312.

More generally, in step 208, the match between the second parameter and the second KPI (e.g. Matches that may be determined in step 208) may correspond to a hidden or dynamic connection between the second parameter and the second KPI. In other words, a connection that is not easily determined through the expert domain knowledge, NLP, other ML methods or by a network analytics function as described above.

The match may generally be determined by determining vector representations for the first and second knowledge graphs. For example, in some embodiments, step 208 may comprise determining a first vector representation for the first knowledge graph using an embedding process and determining a second vector representation for the second knowledge graph using the embedding process.

An embedding process or "embedding technique" may generally comprise positioning the nodes and edges in a vector space. In embodiments herein, as will be described below, a graph-based machine learning process is performed in the first and second vector representations, so as to align matching parameters and KPIs in their respective vector spaces, when the first and second vector representations are compared.

In more detail, the method may comprise using the graph-based machine learning process to align the first subset of the parameters with the first subset of the KPIs when the first vector representation is compared with the second vector representation. In other words, the goal of the graph based machine learning process is to determine vector representations for the parameters and KPIs such that the first subset of the parameters are in equivalent (e.g. symmetrical or mirrored) positions in the first vector representation to the first subset of the KPIs in the second vector representation. In other words, matching KPIs and parameters may be in symmetrical positions in their respective vector representations. In this way, the first subset of the parameters in first vector representation are related/linked to the first subset of the KPIs in the second vector representation.

Figure 4:
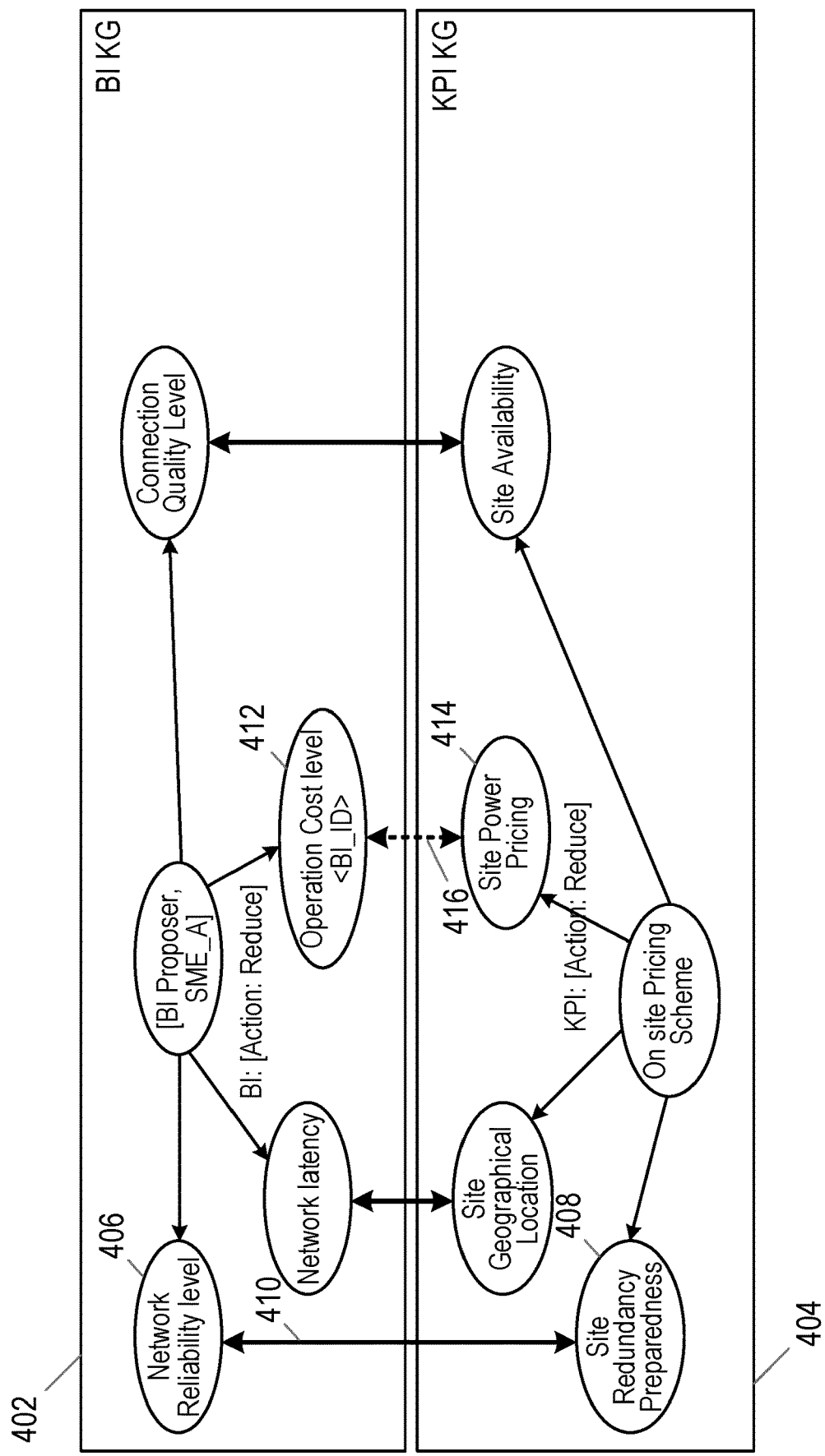
FIG. 4 illustrates two knowledge graphs according to some embodiments herein.

This is illustrated in FIG. 4 whereby a first vector representation of a knowledge graph for parameters in a target network configuration are represented by knowledge graph 402 and a second vector representation of a knowledge graph for KPIs in the communications network is given by knowledge graph 404. In this example, in step 202 a first set of connections between a first set of parameters (comprising the parameters "Network Reliability Level" 406, "Network Latency", "Connection Quality Level") and a first set of KPIs ("Site Redundancy Level" 408, "Site Geographical Location" and "Site Availability" respectively) are obtained. These connections may have been obtained using any of the methods described above with respect to step 202 (e.g. expert knowledge, ML models, NLP or a network analytics function). The first set of connections are indicated by the solid double headed arrows, such as double-headed arrow 410.

From the first set of connections, in step 208, the graph based machine learning model determines vector representations that aligns the respective matches in their respective embedding spaces, as shown in FIG. 4, where matching KPIs are shown in symmetric/equivalent positions in KG 404 to their matching parameters in KG 402.

Based on the determined vector representations, a second (e.g. "other") parameter "Operation Cost Level" 412 may be matched to a second (e.g. "other") KPI "Site Power Pricing" 414 due to the alignment of said parameters in the respective vector representations. This is an example of a hidden or dynamic match, as indicated by the dashed double-headed arrow 414.

The step of using 208 the graph-based machine learning process to align the first subset of the parameters with the first subset of the KPIs may comprise using a loss function comprising a measure of difference between locations of the first subset of parameters in the first vector representation of the first knowledge graph and locations of the respective first subset of KPIs in the second vector representation of the second knowledge graph. The graph-based machine learning process may thus minimise the measure of difference. By minimising the difference between the vector representations of matching parameter-KPI pairs, matching parameter and KPIs are aligned (e.g. placed in equivalent/symmetric) positions in their respective embeddings.

The measure of difference may comprise a measure of dis-similarity. Put another way, the step of using a graph-based machine learning process may further comprise minimising the measure of difference (dis-similarity) between the first subset of parameters and the respective first subset of KPIs in their corresponding first vector space representation and the second vector space representation.

In essence by aligning the first set of parameters with the first set of KPIs, known matching parameters and KPIs are aligned in their respective knowledge-graph vector representations. From this it may be inferred that other parameters and KPIs that are aligned are also linked, or matching.

In more detail, the step 208 of using a graph-based machine learning process may further comprise determining that a second parameter matches a second KPI if the vector representation of the second parameter and the vector representation of the second KPI satisfy a predefined criteria. In this sense, a "second" parameter comprises any other parameter in the target network configuration and the "second" KPI comprises any other KPI in the communications network. It will be appreciated that more than one match maybe made in step 208, for example, step 208 may comprise using a graph-based machine learning process on the first knowledge graph and the second knowledge graph to match a second subset of parameters to a second subset of KPIs.

The predefined criteria may be based on the difference between the vector representation of the second parameter (in the embedding of the first vector representation) and the vector representation of the second KPI (in the embedding of the second vector representation). For example, if the difference is less than a threshold difference then the second parameter and the second KPI may be assumed to align and thus "match". in other words, aligning parameters and KPIs in their respective vector representations are likely to correspond or be linked to one another in their respective domains.

Thus in some embodiments, the predefined criteria is satisfied if a difference between the vector representation of the second parameter and the vector representation of the second KPI is less than a predefined threshold distance. The distance may be a Euclidean distance for example. The skilled person will appreciate however that other distance measures could also be used.

In other embodiments, the predefined criteria is satisfied if the second parameter and the second KPI are nearest neighbours in the embedding process (e.g. outputs from the embedding process), according to a K-nearest neighbour process.

Examples of hidden/dynamic matches (HDEs) that might be determined in step 208 include but are not limited to the following examples:

Target network configuration parameter: Network latency↔Corresponding KPI: Congestion status of the local core network Target network configuration parameter: Quality of connection↔Corresponding KPI: site availability, capacity, packet drop.

Target network configuration parameter: Network reliability↔Corresponding KPI: redundant connection existence, redundant router existence.

There is thus provided a method of matching parameters in a target network configuration, which may be, for example human-readable, into KPIs which may be measured in the network.

As noted above, in some embodiments, the method 200 may be used in configuring a network slice instance. For example, the target network configuration may comprise a business intent, BI, for a network slice instance, NSI, and the method 200 may be used to match parameters in the BI for the NSI to corresponding KPIs for the NSI. The matching may be performed so as to convert the target network configuration into one or more equivalent KPI targets. The method may thus be used to map business intents with KPIs in NSI provisioning. In such embodiments, the method may further comprise initiating a NSI according to the determined KPIs for the NSI. The method 200 may thus be used in multi-domain network slice orchestration.

Figure 5:
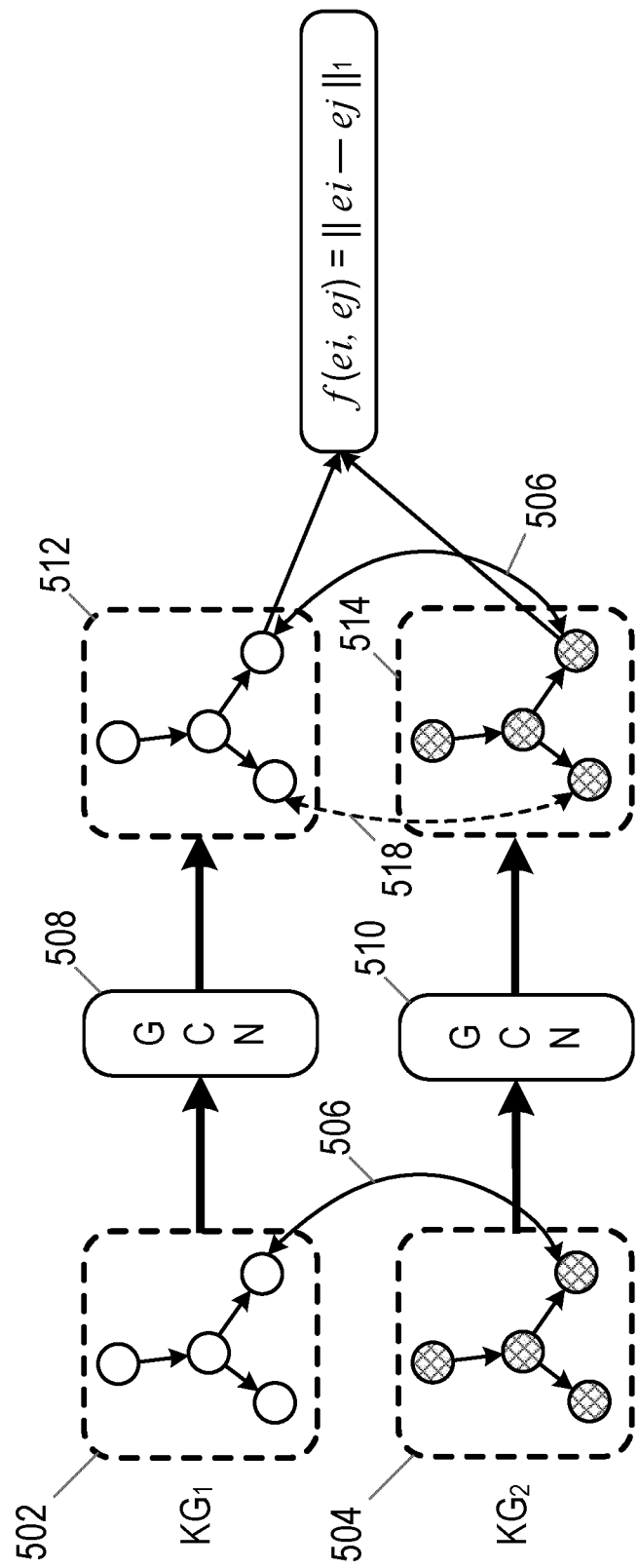
FIG. 5 illustrates the use of graph convolutional networks according to some embodiments herein.

Turning now to FIG. 5 which shows an example matching process performed in step 208 according to an embodiment. In this embodiment, the Learning Framework is supervised learning and the target network configuration comprises a BI. In this embodiment, the graph-based machine learning process comprises: Graph based Cross-Domain Network Alignment.

Model Input: a data structure representing BIs and KPIs, and that indicates a first set of connections between a first subset of parameters in the BIs and a first subset of the KPIs. The first subset of parameters and the first subset of KPIs may be thought of as "pre-aligned entities". Generally, the inputs may comprise, for example:

A first set of connections (e.g. Direct relations; a pre-aligned dataset of matching parameters and KPIs from which to predict other matching parameters and KPIs)

Ontological definitions for constrained (e.g. plausible) ranges. These may comprise scale or format constraints on the KPI. For example, a 'coverage area' KPI should generally be positive, and in a numerical format.

Accumulated historical values

In this sense, the accumulated historical values may comprise a time series of KPI values. E.g: temperature within a day, Capacity measurement in an hour etc.

Model Output: Predicted (BI/Targeted KPI) Mappings (Matching Relations)

Due to the BIs and KPIs depicting information from different domains, in this example, both are represented as first and second Knowledge Graph (KG) attributes. The skilled person will be familiar with representing data as a knowledge graph. See for example, the papers by Wang, Zhichun, et al. 2018 and Xingbo, Junchi Yan, and Hongyuan Zha 2019, cited above.

BIs can be represented to a 'subject-predicate'-like form of '<BI Proposer>+<Action>+<Target's managing Operator>+<Target>+<Proposing timestamp>' In this example, "BI proposer" is the owner of the BI (for example, this could be the proposing Small-Medium-Enterprise, SME), the "Action" is an increase/decrease/improve/construct or similar tendency indicator (where 'construct' is as a tendency from a 'False' property towards a 'True'). "Target's managing Operator" is the target's responsible vendor, in many cases the local mobile operator, as another example, this could also be the local site maintenance vendor. The "Target" is the BI objective. Considering this as the fixed schema of the KG, and all the other attributes are the subgraph of the vertices, one can find the network alignment between the <Target> with the nodes in onsite KPI KG based on the given subgraph matchings (indicated by the dotted line in FIG. 4 as described above).

Problem Modeling:

The problem set-up comprises a first knowledge graph (comprising parameters in the BI domain) and a second knowledge graph (comprising KPIs from the KPI domain): $KG_1, KG_2$, and a set of known matching BI parameter-KPI matching pairs: $S=\{(e_{i1}, e_{i2}) | e_{i1} \in KG_1, e_{i2} \in KG_2\}_{i=1}^{m}$ in the two KGs respectively. The matching pairs are between a first subset of the parameters and a first subset of the KPIs, as described above.

Step 1: Attributed Embedding and Entity Embedding

A graph convolution network (GCN) is used to encode the vertices into vectors. In other words, a first vector representation for the first knowledge graph, and a second vector representation for the second knowledge graph is determined using an embedding process. Two separate GCN are used for $KG_1$, $KG_2$.

The following loss functions may be used to optimize the embedding weights:

$$L_a = \sum_{(e,v) \in KG_1} \sum_{(e',v') \in KG_2} [f(h_a(e), h_a(v)) + \gamma_a - f(h_a(e'), h_a(v'))]_+$$

$$L_s = \sum_{(e,v) \in KG_1} \sum_{(e',v') \in KG_2} [f(h_s(e), h_s(v)) + \gamma_s - f(h_s(e'), h_s(v'))]_+$$

Where in the equation, matching (e,v) denotes a positive matching (existing BI-KPI match from the first set of connections), where (e',v') denotes an impossible matching (e.g. BI and KPI from two different existing matching)

$\gamma_s$ and $\gamma_\alpha$ are hyper-parameters tuned by an expert. f(x,y) is the L1 norm (see for example, the Wikipedia article entitled "Norm (Mathematics)").

$h_s(\cdot)$ and $h_\alpha(\cdot)$ Denotes the structural embedding and the attributed embedding of an entity, where L a and L, are the structural and attributed loss function, they can be collaborate adopted in implementation.

This is illustrated in FIG. 5 which illustrates a first knowledge graph 502 in the BI parameter domain, and a second knowledge graph 504 in the KPI domain. The first set of connections (e.g. in other words "known matches") are illustrated by the lines 506 between matching BI parameters and KPI parameters in their respective knowledge graphs.

The first knowledge graph 502 is fed into a first GCN 508 and the second knowledge graph 504 is fed into a second GCN 510. A vector representation is found for each knowledge graph that minimises the expression f=(ei, ej)=∥ei—ej∥ where (ei,ej) comprise the first set of connections between the first set of (BI) parameters ei and the first set of KPIs ej. In other words, as described above, the graph-based machine learning process minimises the loss function so as to minimise the difference between the vector representations of matching parameter-KPI pairs in their respective embeddings, thus placing them in equivalent positions in their respective KGs.

In the resulting first and second vector representations 512 and 514 respectively, the first set of BI parameters are in corresponding positions to their matching first set of KPI parameters, as indicated by the solid arrows 506. A match between a second (e.g. other) BI parameter and a second (e.g. other) KPI may be deduced from their symmetrical positioning in their respective vector representations. An example second match is indicated by the dashed line 518.

Step 2: Predict Potential Matching

For $e_i$ as a BI in $KG_1$ and $v_j$ as a KPI in $KG_2$:

To predict possible matching BIs and KPIs, using the respective embeddings, in one example, the following distance measurement may be used:

$$D(e_i, v_j) = \beta \frac{f(h_s(e_i), h_s(v_j))}{d_s} + (1-\beta)\frac{f(h_a(e_i), h_a(v_j))}{d_a}$$

Where $d_s$ and $d_\alpha$ are dimensionality of structural embedding $h_s(\cdot)$ and attribute embedding $h_a(\cdot)\beta$ is the hyper-parameter tuned by expert, to balance the two factors.

If $D(e_i, v_j)$ is smaller than a defined threshold for a BI parameter and KPI pair (referred to in step 208 as the second parameter and second KPI respectively), there exists a potential correspondence/link between the 2 entities. And thus, a match is made.

Other optional approaches to determine matches (based on distance) include, for example, collaborative filtering and K-nearest neighbor algorithm as noted above.

Figure 6:
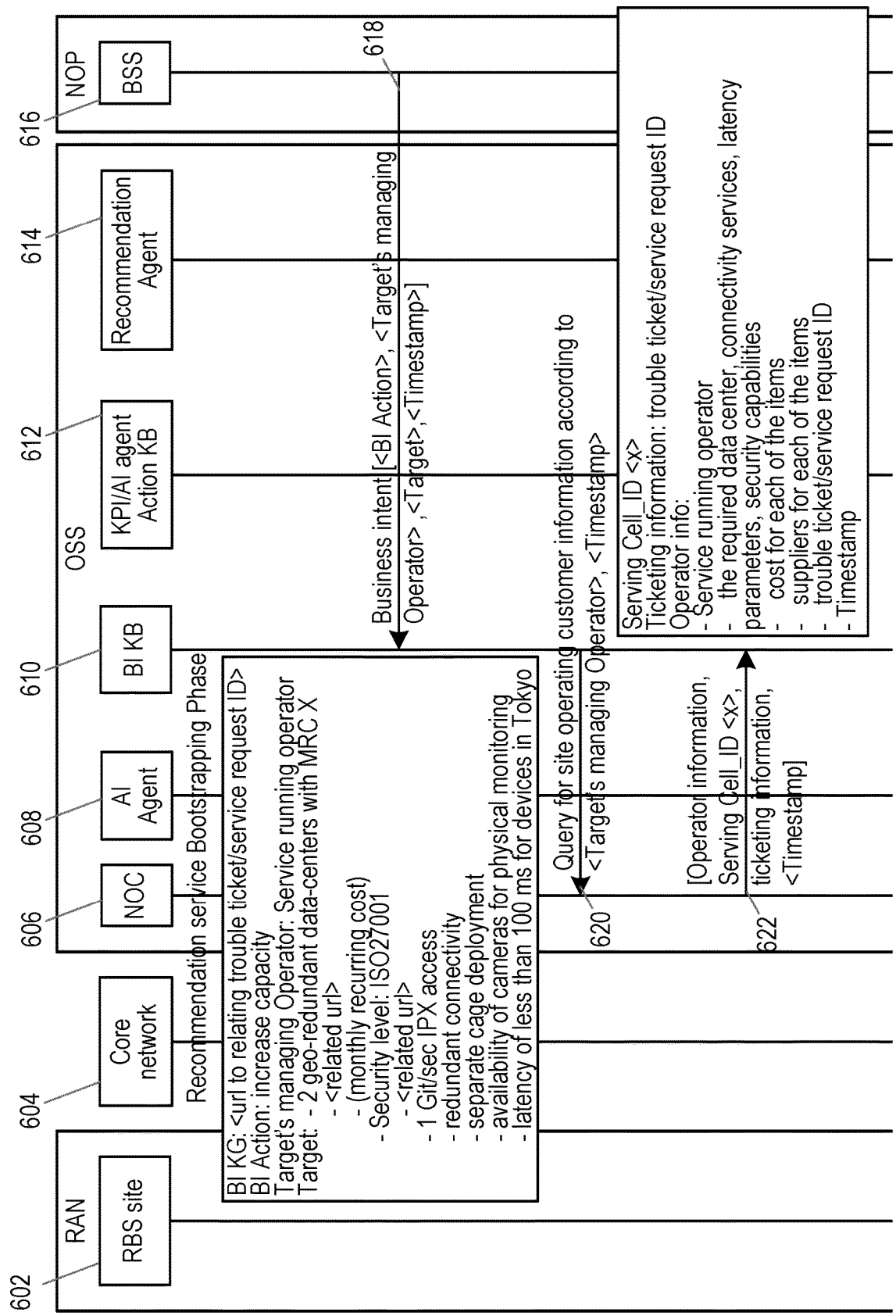
FIG. 6 illustrates a signal diagram according to some embodiments herein.
Figure 6:
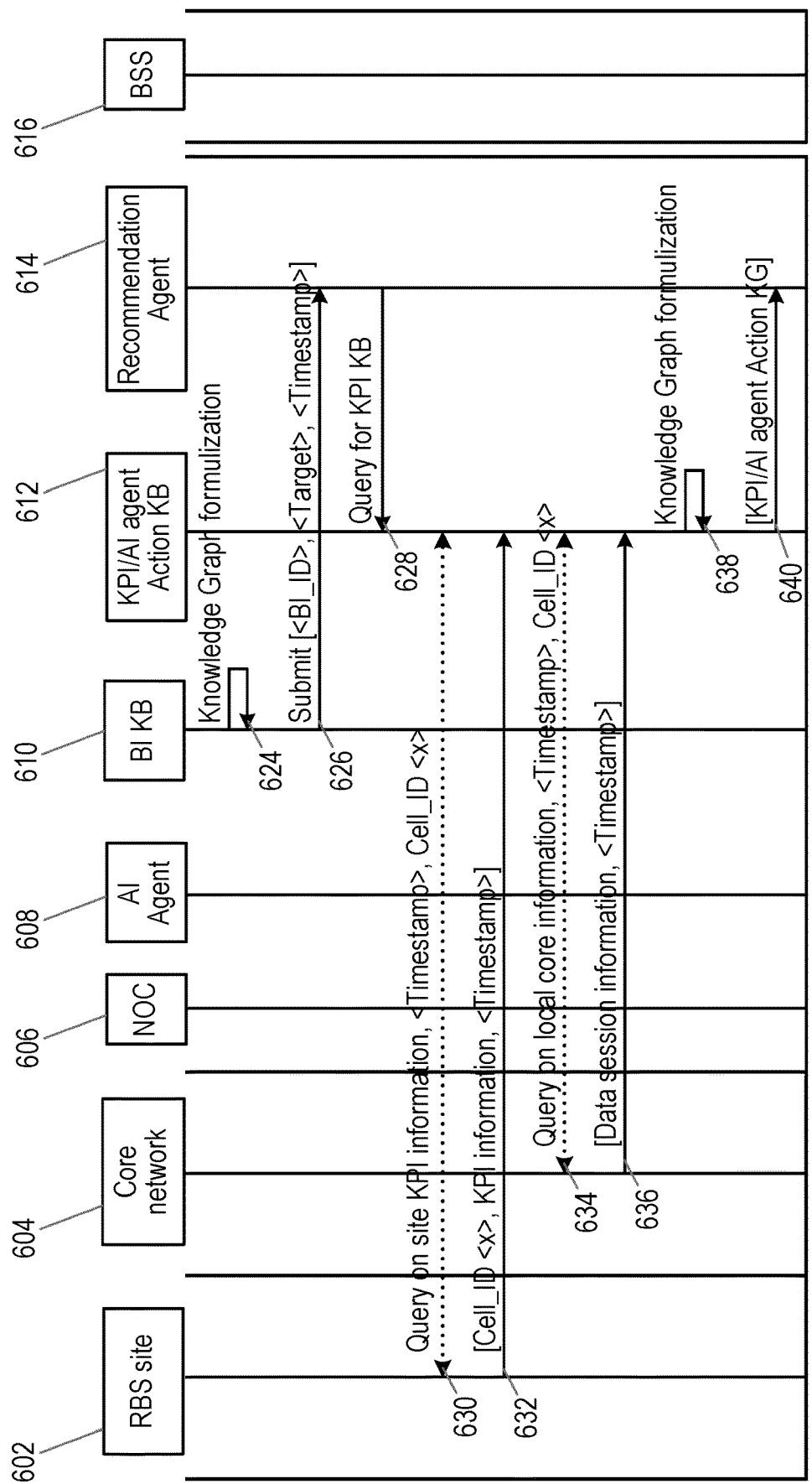

Turning now to FIG. 6 which shows a signal diagram for data collection and bootstrapping according to some embodiments herein. This signalling diagram illustrates signals between a radio base station site (RBS site) 602, a Core network 604, a Network Operations Centre 606, an AI Agent 608 a target network configuration parameter knowledge graph (BI KB) 610, a KPI/AI agent Action Knowledge Base 612, a recommendation agent 614 and a BSS (Business Support System) 616 in the Network Operator.

In signal 618, a target network configuration (in this example in the form of a BI) is sent from BSS 616 to BI KB 610.

As an example whereby the target network parameters relate to setting up a new site, the message 610 may comprise:

Setup-new site (BI: increase capacity)

2 geo-redundant datacenters with MRC X (monthly recurring cost), ISO27001 security level, 1 GBit/sec Internet Access, 1 Gbit/sec IPX access, redundant connectivity, separate cage deployment, availability of cameras for physical monitoring, latency of less than 100 ms for devices in Tokyo.

Timestamp

In signal 620: BI KB 610 queries the NOC 606 for resources that fulfill the target network configuration (BI) received in signal 610.

In signal 622, the response contains:

the required data center, connectivity services, latency parameters, security capabilities cost for each of the items suppliers for each of the items trouble ticket/service request ID In 624, the BI KB represents the parameters of the target network configuration as a first knowledge graph (according to step 204 as described above). The first knowledge graph (or "BI KG"), is then stored in BI Knowledge Base 610.

In signal 626, BI KB 610 submits the first knowledge graph to recommendation agent 614.

In signal 628, the Recommendation agent 614 queries KPI/AI agent KB 612 in order to obtain a second knowledge graph of the KPIs (according to step 206 as described above).

In signals 630, 632, 634 and 636, the KPI/AI agent KB 612 queries local Core network 604 respectively to retrieve, for example:

current levels of latency based on recent measurements. This is an example, and other KPIs may also be obtained.

In signal 638 the KPI/AI agent represents the KPIs as a second knowledge graph (according to step 206 as described above). The second knowledge graph (or "BI KG"), is then sent to the recommendation agent 614 in step 640.

In this way, the recommendation agent is provided with the first and second knowledge graphs. It will be appreciated that the modules and agents outlined above are merely an example and that the functionality described with respect to FIG. 6 may be performed by different modules to those illustrated in FIG. 6. For example, the functionality performed by the AI agent 608, BI KB 610, KPI/AI agent Action KB 612 and the Recommendation Agent 614 may all be performed by a single module.

Furthermore, the steps above may be generalized to any type of data. For example, more generally, for an arbitrary target network configuration, a call flow for finding the KPI of interest could be as illustrated in the following example: This example uses the format: [<BI Proposer>+<Action>+<Target's managing Operator>+<Target>], as described above.

In step 618: a target network configuration (e.g. such as a BI) is sent to BI KB 610, with information such as:

Action (increase/decrease) towards the business target

BI's Target (e.g: cost level, security level, ISO standard, etc, e.g. indicating the goal of optimization)

Target's managing operator (Site operating operator, site ownership information)

Timestamp of BI

In step 620: according to Target's managing operator information, BI KB 610 queries the operator's serving Network Operation Center (NOC) 606 for the Small-Medium Enterprise's information, During the time of BI's time stamp, In step 622: the information fed back, includes for example:

Managing Operator information (Site operating operator, site ownership information), as a sub-entity attached to the managing cell in KPI KG.

Weather information on BI's time stamp: provided by NOC and being a part of geographical specific event included in Public Safety Grade Site Hardening Requirement, as a sub-entity attached to the relating cell in KPI KG.

NOC's serving cells' ID<x>: all the cell ID, under NOC's surveillance, as a sub-entity attached to representing cell in KPI KG.

Trouble Ticket information on BI's time stamp: Provided by NOC, as a sub-entity attached to the ticket relating cell in KPI KG.

In step 624: the BI information is represented as a first KG according to step 204 above, (referred to as BI KG), stored in BI Knowledge Base In step 626: the BI KB 610 sends the BI KG to recommendation agent 614.

In step 628: The recommendation agent 614 queries the KPI/AI agent KB 612 for the KPI KG.

In steps 630, 632, 634, and 636 the KPI/AI agent KB 612 queries RBS Sites 602 and local Core network respectively, with NOC's serving cells' ID<x>. to retrieve:

RBS site information, attached as a sub-entity attached to the relating cell in KPI KG, including
  a. Power statues info (optional power source & respective pricing)
  b. Redundancy preparedness (redundant connection existence, redundant router existence)
  c. Site availability, capacity
  d. Cell location
  e. Alarm on BI time stamp
  f. Etc . . .
Local core serving RBS site information, attached as a sub-entity attached to the relating cell in KPI KG including
  a. Data session congestion statues, packet drop.
  b. Etc.

In step 638, based on the feedback, the KPI/agent 612 represents the KPIs as a second knowledge graph, and submits the KPI KG to recommendation agent in step 640.

The corresponding UML to FIG. 6 is provided in Annex 1.

Figure 7:
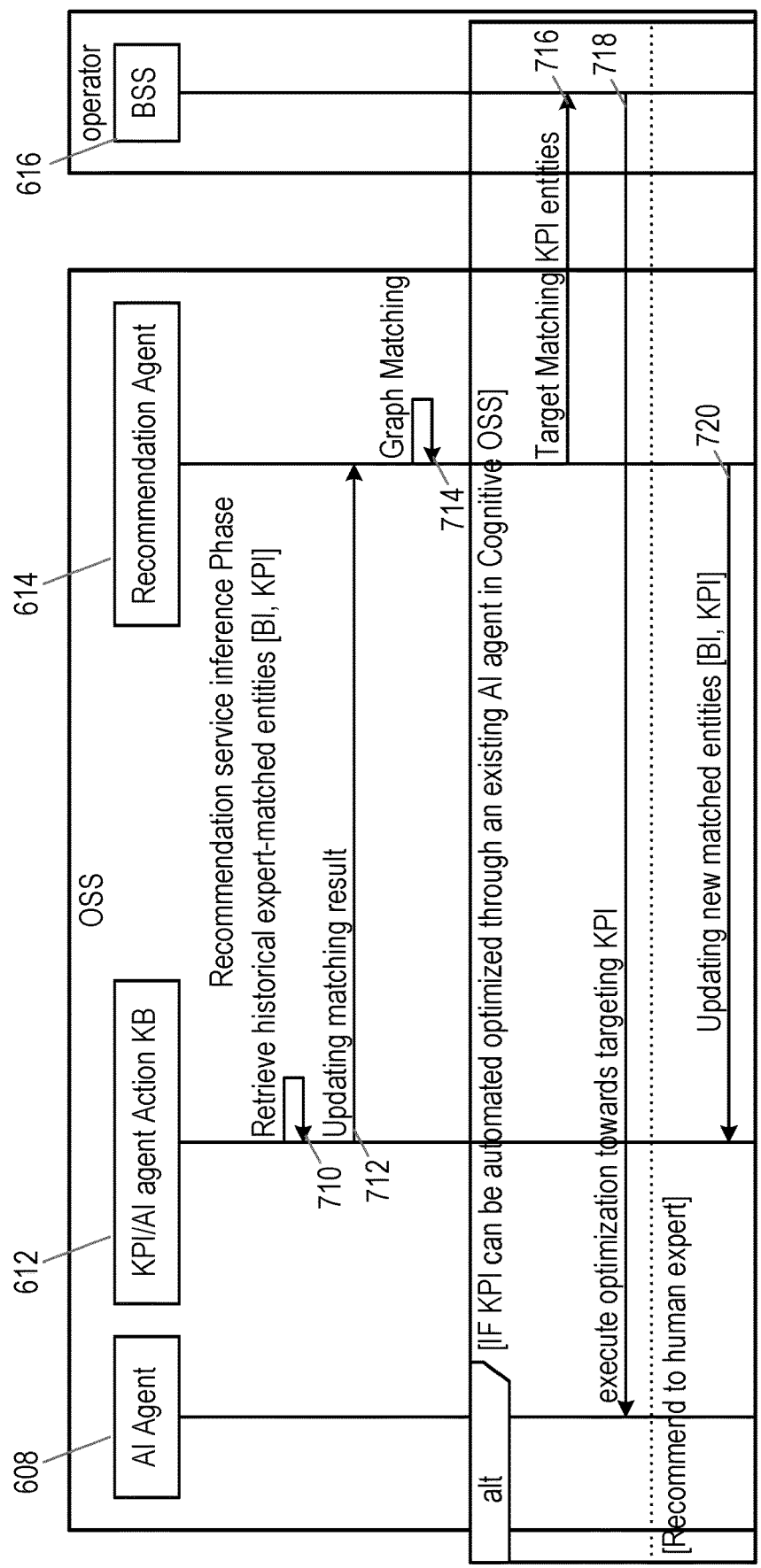
FIG. 7 illustrates another signal diagram according to some embodiments herein.

Turning now to FIG. 7, after the bootstrapping Phase illustrated in FIG. 6, the first and second knowledge graphs corresponding to the parameters in the target network configuration and KPIs respectively are obtained by Recommendation agent. The recommendation agent performs step 208. Step 208 is conducted in system runtime.

In step 710: a first set of connections are obtained between a first subset of the parameters and a first subset of the KPIs (e.g. historic/ongoing matches provided by an expert or any other method described in step 202 above). In step 712 the first set of connections are sent to the recommendation agent 706 to update the known matches (in other words the matching results are updated).

In step 714, the recommendation agent performs step 208 described above and uses a graph-based process to determine other match(es) between second parameter(s) and second KPI(s). In other words, based on the preliminary matches of the first set of connections, and the shape of the two KGs, the recommendation agent will conduct graph alignment/matching as described above with respect to step 208 and FIGS. 4 and 5 to find hidden matches between unmatched entities (parameters-KPIs) of the two KGs.

The second KPI will need to be tracked in order to satisfy the second parameter in the BI. Thus, if there exists an AI agent in the cognitive OSS configured to optimize the second KPI (as matched to the second parameter of the BI) then, the matched KPIs will be sent to the BSS in step 716 which will send the matched KPI to the respective AI agent to cause the AI agent to optimize the matched KPI.

Alternatively, if no AI agent is tracking the second KPI, the recommendation agent may submit the matching KPI and the given BI to the KPI/AI agent Action KB module 612, in order, for example, to request the next operation from a human expert.

In this way, the method 200 may be used to determine appropriate KPIs to track in order to meet a BI. The UML for the sequence diagram of FIG. 7 is given in Annex 2.

Turning now to other embodiments, in some embodiments there is a computer program comprising instructions which, when executed on at least one processor, cause the at least one processor to carry out any of the methods herein (such as the method 200).

In some embodiments, there is a carrier containing a computer program such as the computer program above, wherein the carrier comprises one of an electronic signal, optical signal, radio signal or computer readable storage medium.

In some embodiments there is a computer program product comprising non transitory computer readable media having stored thereon a computer program such as the computer program above.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

| Annex 1 |
|---|

```
#Code to sequence diagram of Fig. 6
@startuml
box "RAN"
participant "RBS site"
end box
participant "Core network"
box "OSS"
participant "NOC"
participant "AI Agent"
participant "BI KB"
participant "KPI/AI agent Action KB"
participant "Recommendation Agent"
end box
box "NOP"
participant "BSS"
end box
autonumber
... Recommendation service Bootstrapping Phase ...
"BSS" -> "BI KB": Business intent [<BI Action>, <Target's managing Operator>,<Target>, <Timestamp>]
note left
BI KG: < url to relating trouble ticket/service request ID>
BI Action: increase capacity
Target's managing Operator: Service running operator
Target: - 2 geo-redundant data-centers with MRC X
             - <related url>
              -(monthly recurring cost)
           - Security level: ISO27001
             - <related url>
           - 1 Gbit/sec IPX access
           - redundant connectivity
           - separate cage deployment
           - availability of cameras for physical monitoring
           - latency of less than 100 ms for devices in Tokyo
end note
"BI KB" -> "NOC": Query for site operating customer information according to <Target's managing Operator>,
<Timestamp>
"NOC" -> "BI KB": [Operator information, Serving Cell_ID <x>, ticketing information, <Timestamp>]
note right
Serving Cell_ID <x>
ticketing information: trouble ticket/service request ID
Operator info:
-         Service running operator
-               the required data center, connectivity services, latency parameters, security capabilities
-               cost for each of the items
-               suppliers for each of the items
-               trouble ticket/service request ID
-         Timestamp
end note
"BI KB"->"BI KB": Knowledge Graph formulization
"BI KB" -> "Recommendation Agent": submit [<BI_ID>, <Target>, <Timestamp>]
"Recommendation Agent" -> "KPI/AI agent Action KB": Query for KPI KB
"KPI/AI agent Action KB" <--> "RBS site": Query on site KPI information, <Timestamp>, Cell_ID <x>
"RBS site" -> "KPI/AI agent Action KB": [Cell_ID <x>, KPI information, <Timestamp>]
"KPI/AI agent Action KB" <--> "Core network": Query on local core information, <Timestamp>, Cell_ID <x>
"Core network" -> "KPI/AI agent Action KB": [Data session information, <Timestamp>]
"KPI/AI agent Action KB"->"KPI/AI agent Action KB": Knowledge Graph formulization
"KPI/AI agent Action KB" -> "Recommendation Agent" : [KPI/AI agent Action KG]
@enduml
```

| Annex 2 |
|---|

```
@startuml
box "OSS"
participant "AI Agent"
participant "KPI/AI agent Action KB"
participant "Recommendation Agent"
end box
box operator
participant "BSS"
end box
autonumber
... Recommendation service inference Phase ...
"KPI/AI agent Action KB" -> "KPI/AI agent Action KB": Retrieve historical expert-matched entities [BI, KPI]
"KPI/AI agent Action KB" -> "Recommendation Agent": Updating matching result
```

| Annex 2 |
| --- |
| "Recommendation Agent" −> "Recommendation Agent": Graph Matching
alt IF KPI can be automated optimized through an existing AI agent in Cognitive OSS
"Recommendation Agent" −> "BSS": Target Matching KPI entities
"BSS" −> "AI Agent" : excute optimization towards targeting KPI
else Recommend to human expert
"Recommendation Agent" −> "KPI/AI agent Action KB": Updating new matched entities [BI, KPI]
end
@enduml |

The invention claimed is:

1. A computer implemented method performed by a node in a communications network, the method comprising:

representing parameters of a target network configuration as a first knowledge graph, the target network configuration comprising a business intent for a network slice instance (NSI) of the communications network to be used for providing a communications service;

representing key performance indicators (KPIs) measurable for the communications network as a second knowledge graph;

obtaining information indicating relationships between the KPIs and a first subset of the parameters of the target network configuration;

using the indicated relationships and the first and second knowledge graphs in a graph-based machine learning process to learn relationships between the KPIs and a remaining subset of the parameters of the target network configuration;

converting the parameters of the target network configuration into KPI targets for the KPIs, based on the indicated and learned relationships; and initiating the NSI in the communications network, including configuring the NSI for satisfaction of the KPI targets.

2. The method as in claim 1, wherein the indicated relationships indicate relationships between a first subset of the KPIs and the first subset of parameters, and wherein the step of using a graph-based machine learning process further comprises:

determining a first vector representation for the first knowledge graph using an embedding process;

determining a second vector representation for the second knowledge graph using the embedding process; and using the graph-based machine learning process to align the first subset of the parameters with the first subset of the KPIs, when the first vector representation is compared with the second vector representation.

3. The method as in claim 2, wherein the first subset of the parameters and the first subset of KPIs are in equivalent positions in the first and second vector representations.

4. The method as in claim 2, wherein the step of using the graph-based machine learning process to align the first subset of the parameters with the first subset of the KPIs comprises:

using a loss function comprising a measure of difference between locations of the first subset of parameters in the first vector representation of the first knowledge graph and locations of the respective first subset of KPIs in the second vector representation of the second knowledge graph.

5. The method as in claim 4 wherein the graph based machine learning process minimises the measure of difference.

6. The method as in claim 2, wherein, with respect to learning the relationships between the KPIs and the remaining subset of the parameters of the target network configuration, the step of using a graph-based machine learning process comprises:

determining that a parameter in the remaining subset of parameters is related to a particular KPI responsive to the vector representation of the parameter and the vector representation of the particular KPI satisfying a predefined criteria.

7. The method as in claim 6, wherein the predefined criteria is satisfied if:

a difference between the vector representation of the parameter and the vector representation of the particular KPI is less than a predefined threshold distance; or the parameter and the particular KPI are nearest neighbours in the embedding process according to a K-nearest neighbour process.

8. The method as in claim 1, wherein obtaining the information indicating relationships between the KPIs and the first subset of parameters of the target network configuration comprises determining a first set of connections between the first subset of the parameters and a first subset of the KPIs, based on at least one of:

determining the first set of connections using natural language processing (NLP);

determining the first set of connections using a second machine learning model trained to predict connections between respective ones among the parameters and respective KPIs among the KPIs; or determining the first set of connections using a network analytics function.

9. The method as in claim 1, wherein the parameters in the target network configuration are descriptive or human-readable and wherein the KPIs comprise measurable quantities in the communications network.

10. The method as in claim 1, wherein the method is for use in multi-domain network slice orchestration.

11. The method as in claim 1, wherein the graph-based machine learning process comprises a graph convolution network (GCN).

12. A node configured for operation in a communications network, the node comprising:

a memory comprising instruction data representing a set of instructions; and a processor configured to communicate with the memory and to execute the set of instructions, wherein the set of instructions, when executed by the processor, cause the processor to:

represent parameters of a target network configuration as a first knowledge graph, the target network configuration comprising a business intent for a network slice instance (NSI) of the communications network to be used for providing a communications service;

represent key performance indicators (KPIs) measurable for the communications network as a second knowledge graph;

obtain information indicating relationships between the KPIs and a first subset of the parameters of the target network configuration;

use the indicated relationships and the first and second knowledge graphs in a graph-based machine learning process to learn relationships between the KPIs and a remaining subset of the parameters of the target network configuration;

convert the parameters of the target network configuration into KPI targets for the KPIs, based on the indicated and learned relationships; and initiate the NSI in the communications network, including configuring the NSI for satisfaction of the KPI targets.

13. A node configured for operation in a communications network, the node comprising:

a communications interface; and processing circuitry operatively associated with the communications interface and configured to:

represent parameters of a target network configuration as a first knowledge graph, the target network configuration comprising a business intent for a network slice instance (NSI) of the communications network to be used for providing a communications service;

represent key performance indicators (KPIs) measurable for the communications network as a second knowledge graph;

use the indicated relationships and the first and second knowledge graphs in a graph-based machine learning process to learn relationships between the KPIs and a remaining subset of the parameters of the target network configuration;

convert the parameters of the target network configuration into KPI targets for the KPIs, based on the indicated and learned relationships; and initiate the NSI in the communications network, including configuring the NSI for satisfaction of the KPI targets.

* * * * *